UNITED STATES PATENT OFFICE.

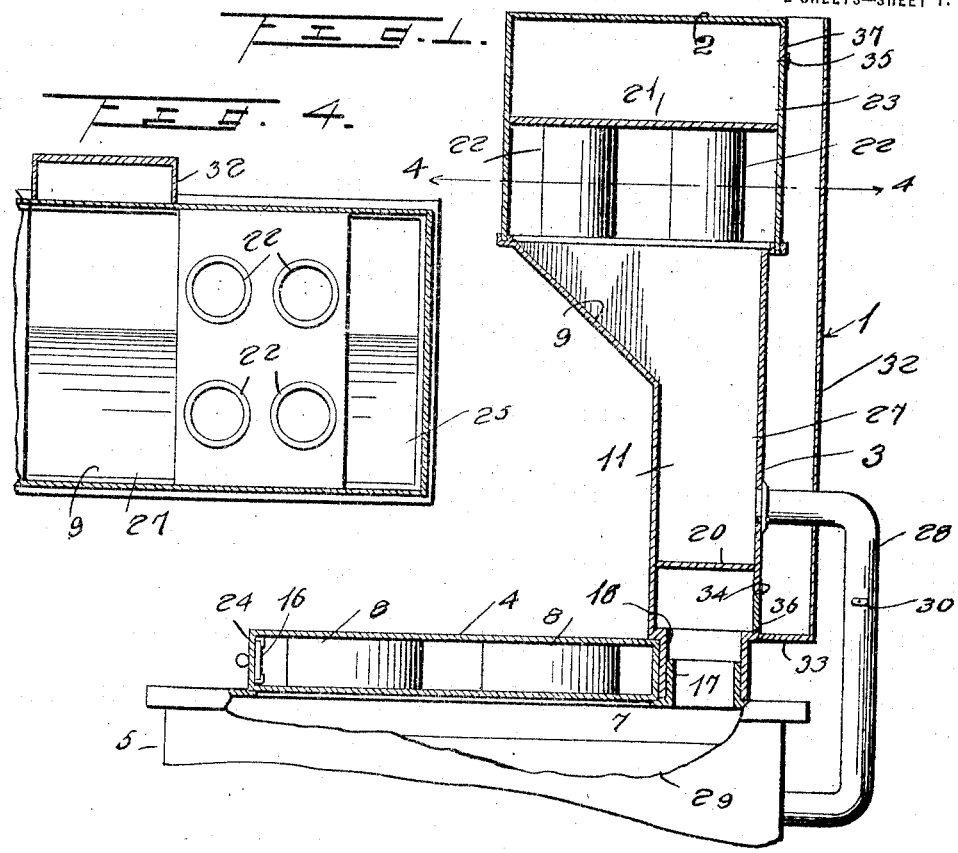

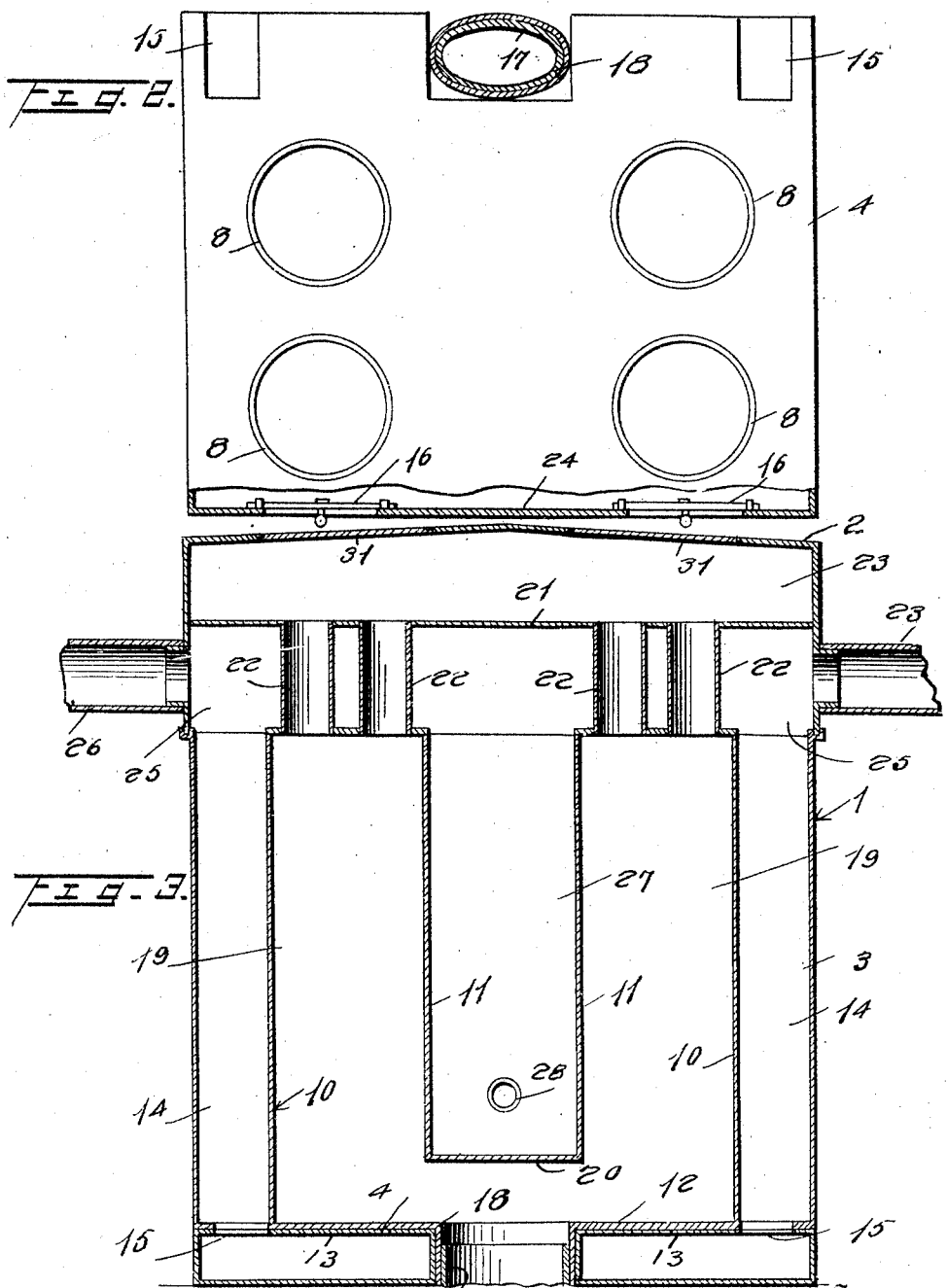

IRA G. YOST, OF READING, PENNSYLVANIA.

HEATING ATTACHMENT.

1,334,827.

Specification of Letters Patent. Patented Mar. 23, 1920.

Application filed September 4, 1918. Serial No. 252,584.

*To all whom it may concern:*

Be it known that I, IRA G. YOST, a citizen of the United States, residing at Reading, in the county of Berks and State of Pennsylvania, have invented certain new and useful Improvements in Heating Attachments; and I do hereby declare the following to be a full, clear, and exact description of the invention, such as will enable others skilled in the art to which it appertains to make and use the same.

This invention relates to improvements in heating attachments for stoves preferably of the cooking type, and has for one of its objects the provision of means whereby air may be heated by the top of the stove for the purpose of heating rooms or points foreign to the stove.

Another object of this invention is the provision of means whereby the smoke or by-products of combustion can be utilized to heat the air.

A further object of this invention is the provision of means whereby the device can be readily and conveniently applied to stoves of the cooking type and which are of a well known construction without making any material change in the construction thereof, and also whereby the device can be readily removed when desired.

A still further object of this invention is the provision of a heating device of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view of a heating attachment constructed in accordance with my invention.

Fig. 2 is a top plan view of one of the sections of the heating device,

Fig. 3 is a vertical section illustrating the intermediate and upper sections of the heating device, Fig. 4 is a sectional view taken on the line 4—4 of Fig. 1, and Fig. 5 is a fragmentary vertical sectional view of a stove illustrating the lower section applied thereto.

Referring in detail to the drawings the numeral 1 indicates as an entirety an inclosed air heating device consisting of an upper section 2, an intermediate section 3, and a lower section 4. The lower section 4 consists of a substantially rectangular casing adapted to rest upon the top of a stove, as illustrated in Fig. 5. The top plate of the stove 5 having the usual openings closed by ordinary lids is removed and the rectangular casing 4 is positioned therein so that the same comes in contact with the fire located within the fire box 6 and also directly over the heat passage 7 of the stove 5. The lower section 4 is of hollow formation, and is provided with a plurality of cylindrical members 8 that connect openings formed within the top and bottom walls of the lower section to form the usual kettle and fuel feeding openings of the stove and which are adapted to be closed by the ordinary removable lids. The cylindrical members 8 are adapted to prevent the products of combustion and the heat directly from the fire and the heat passage 7 from entering the interior of the lower section 4. The intermediate section 3 consists of a casing disposed vertically and having its upper end flared as illustrated at 9. The intermediate section 3 has located therein a plurality of partition walls 10 and 11. The partition walls 10 are mounted upon a horizontally disposed partition wall 12 positioned above the bottom wall 13 of the intermediate section, and also coöperates with the wall of the intermediate section in forming air passages 14. The top wall of the lower section 4 at its rear corners is provided with openings 15 that register with openings formed in the bottom wall 13 of the intermediate section 3 and in communication with the air passages 14 so that air within the lower section may enter the air passages of the intermediate section. The front wall of the lower section 4 is provided with openings for permitting air to enter the lower section, and which openings can be opened and closed by sliding doors, 16, for controlling the amount of air entering the lower section, and also the intermediate section.

A flue 17 extends through the partition wall 12 and the bottom wall of the intermediate section and is connected to the smoke pipe 18 of the stove so that the smoke or by-products of combustion may enter the smoke passages 19 of the intermediate section for further heating the air passing through the air passages 14. The partitions 11 are connected at their lower ends by a partition 20 which is positioned directly over the flue 17 for acting as a deflector for causing the smoke or bi-products of combustion to spread into each of the smoke passages 19.

The upper section 2 consists of a casing positioned upon the intermediate section 3 and has formed therein a horizontal partition 21 carrying smoke flues 22 that connect with the smoke flues 19 of the intermediate section 3 for permitting the smoke or by-products of combustion to enter the smoke box 23 formed by the partition 21 and the top wall of the upper section 2.

The partition 21 also coöperates with the intermediate section 3 in forming a heat receiving chamber 25 which is provided with oppositely disposed heat outlets to which are connected pipes 26 for conveying the heated air to different rooms or to points foreign from the stove.

It is to be noted that the partitions 11 also form an intermediate chamber 27 adapted to receive the air from the air passage 14 by way of the heat chamber 25 thus increasing the space for the reception of the air to be heated and also bringing it in closer contact with the smoke passages 19. The lower end of the chamber 27 has connected thereto a pipe 28 which is in turn connected to the oven 29 of the stove 5 so that heat within the oven may pass into the chamber 27 and the heat receiving chamber 25. A suitable damper 30 is positioned in the pipe 28 for opening and closing the same, thus providing means wherein the heat can be retained within the oven 29 of the stove 5 when desired, or when utilizing the oven for cooking. The top wall of the upper section 2 is provided with hinged doors 31 located directly over the flues 22 so that the smoke passages and the flues 22 can be cleaned when desired.

A vertically disposed smoke pipe 32 is secured to the rear wall of the upper and intermediate sections 2 and 3 and has its lower end closed as illustrated at 33 while its upper end is adapted to be connected to the flue of the chimney. The smoke pipe 32 is of such structure that the rear wall of the intermediate and upper sections form a wall thereto, and the sections 2 and 3 are provided with openings 34 and 35 which communicate with the upper and lower ends of the smoke pipe 32 and are provided with dampers 36 and 37 respectively. When not desiring to pass the smoke or by-products of combustion through the intermediate and upper sections, the damper 36 is opened and the damper 37 is closed permitting the smoke or by-products of combustion to pass outwardly through the smoke pipe 32 giving a direct draft to the fire in the fire box 6 of the stove 5. By closing the damper 36, the by-products of combustion are compelled to pass through the smoke passages 19 into the smoke receiving chamber 23 thus heating the air within the air passages 14.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A heating attachment comprising a lower casing adapted to rest on and close the top of a stove and be heated thereby, means for supplying the stove with fuel through the lower casing, an intermediate casing associated with the lower casing and having heat passages in communication with the interior of the lower casing, means admitting air to the lower casing, smoke passages formed in the intermediate casing, an upper casing supported by the intermediate casing, a heat chamber in said upper casing and in communication with the heat passages, and a smoke chamber in the upper casing and connected to the smoke passages of the intermediate casing.

2. A heating attachment comprising a lower casing adapted to rest upon a stove, means for supplying the stove with fuel through the lower casing, and intermediate casings partially supported by the lower casing and resting on the stove, and having heat passages in communication with the interior of the lower casing, means admitting air to the lower casing, smoke passages formed in the intermediate casing between the air passages thereof and adapted to be connected to the smoke flue of a stove, an upper casing supported by the intermediate casing, a heat chamber in said upper casing and in communication with the heat passages, a smoke chamber in the upper casing and arranged over the heat chamber, and flues connecting the smoke passages to the smoke chamber and extending through the heat chamber.

In testimony whereof I affix my signature in presence of two witnesses.

IRA G. YOST.

Witnesses:
HEBER Y. YOST,
J. VICTOR GRIM.